United States Patent [19]

Smith

[11] 4,121,297
[45] Oct. 17, 1978

[54] APPARATUS FOR CORRELATING TWO TIME SERIES

[75] Inventor: James W. Smith, Tulsa, Okla.

[73] Assignee: Standard Oil Company (Indiana), Chicago, Ill.

[21] Appl. No.: 806,784

[22] Filed: Jun. 15, 1977

Related U.S. Application Data

[63] Continuation of Ser. No. 691,927, Jun. 1, 1976, abandoned.

[51] Int. Cl.² .................. G06F 15/34; G01V 1/36
[52] U.S. Cl. .............................. 364/728; 340/15.5 TA; 340/15.5 DP; 364/421
[58] Field of Search .............. 364/728, 819, 604, 421; 340/15.5 TA, 15.5 TC, 15.5 DP

[56] References Cited

U.S. PATENT DOCUMENTS

| | | | |
|---|---|---|---|
| 3,532,867 | 10/1970 | Ricketts et al. | 36´/728 |
| 3,555,258 | 1/1971 | Berthier et al. | 364/819 |
| 3,646,333 | 2/1972 | Pryor, Jr. | 364/728 |
| 3,698,009 | 10/1972 | Barbier | 340/15.5 DP |

OTHER PUBLICATIONS

Kendall: A New Algorithm for Computing Correlations, IEEE Transactions on Computers, Jan. 1974, pp. 88–89.

*Primary Examiner*—Felix D. Gruber
*Attorney, Agent, or Firm*—Albert C. Metrailer; Arthur McIlroy

[57] ABSTRACT

A method and apparatus for correlating two time series of digital quantities comprising means for converting one of the time series to a sign bit series and means for algebraically summing values of the second series which occur at times corresponding to the zero crossings of the sign bit series. The algebraic summation includes the modification of the signs of the summed values according to the direction of the zero crossing which occurs in the sign bit series. The preferred embodiment is a field correlator for use in geophysical seismic surveying to monitor data as it is recorded. The field correlator converts a digitized pilot signal into a sign bit only series, which is then correlated to a digitized record of a geophone spread output by summing only those samples of the geophone outputs which correspond to zero crossings of the pilot signal for a given lag value. As in standard correlation, the summation is repeated for each lag of the pilot relative to the detected signal so that an earth spikes trace is generated.

9 Claims, 2 Drawing Figures

APPARATUS FOR CORRELATING TWO TIME SERIES

This is a continuation of application Ser. No. 691,927, filed June 1, 1976, now abandoned.

BACKGROUND OF THE INVENTION

This invention relates to methods and apparatus for correlating two time series of digital quantities.

The use of swept frequency acoustic signals is well known in the geophysical prospecting art. A basic disclosure of such use is contained in U.S. Pat. No. 2,688,124 entitled "Method of and Apparatus for Determining Traveltime of Signals" issued to Doty et al. on Aug. 31, 1954. As disclosed in this Doty patent, low energy level seismic waves may be used effectively for geophysical prospecting if the frequency of the seismic wave is swept according to a known pattern and the reflection signals detected by geophones at the surface are crosscorrelated with this known pattern or pilot signal. Standard practice in geophysical prospecting is to record the outputs of geophones at the earth's surface and to perform the crosscorrelation sometime later, and typically in a large general purpose computer.

The output of a crosscorrelator in a swept frequency geophysical prospecting system is an earth spikes trace similar to the outputs of impulse type geophysical prospecting systems. One trained in the geophysical prospecting art can derive considerable information by visual examination of an earth spikes trace, but has great difficulty in learning anything from a visual examination of a direct output of a geophone in a swept frequency system. A visual examination of an earth spikes trace can be quite useful in the field to allow a technician to know if the equipment is operating properly and for a geophysicist to identify areas of interest which might warrant further exploration before leaving the field location. Thus it is seen that it is desirable to include a correlator in the field portion of a swept frequency seismic system.

Since standard correlation requires the use of large general purpose computers, or expensive special purpose computers, they generally have not been included in field portions of swept frequency geophysical systems. Disclosures of correlation apparatus suitable for field use may be found in U.S. Pat. No. 3,863,057 entitled "Apparatus for Serially-Correlating Time Series" issued to Siems on Jan. 28, 1975, and U.S. Pat. No. 3,863,058 entitled "Apparatus for Digital Correlation" issued to Savit on Jan. 28, 1975. The correlator disclosed by Siems is smaller than a standard correlator because it ignores the mantissa of pilot and data samples and multiplies only the signed exponent of each pair of samples to generate a correlation between pilot and data. In the Savit correlator, the multiplication step of the standard correlator is eliminated by again ignoring the mantissas of the samples and adding the exponents of pairs of pilot and data samples. Each sum is exponentiated to obtain the equivalent product which is then summed with other products to generate the final correlation. Thus, it is seen that both Siems and Savit reduce correlator complexity by reducing the number of digital bits which represent each sample and Savit additionally reduces complexity by avoiding the multiplication step but does so at the cost of adding digital exponentiators. But both of these correlators still require that mathematical operations be performed upon every sample contained in the shorter of the two time series of samples for each correlation.

SUMMARY OF THE INVENTION

Accordingly, an object of the present invention is to provide simple and improved apparatus for correlating two time series of sampled quantities.

Another object of the present invention is to provide apparatus for correlating two time series of sampled quantities without multiplying pairs of sampled quantities.

Another object of the present invention is to provide apparatus for correlating two time series of sampled quantities which performs mathematical operations on substantially less than all of the quantities contained in the smaller of two time series.

These and other objects of the present invention are achieved by providing a correlator comprising means for generating a sign bit representation of a first of two time series of sampled quantities, and summation means including sign changing means for accumulating the sum of the values of a second of the two time series which occur at times corresponding to the zero crossings of the first time series as determined from the sign bit representation. The sign bit modifying means changes the signs of the samples accumulated by the summation means which correspond to positive-going zero crossings of the first time series.

BRIEF DESCRIPTION OF THE DRAWING

The present invention may be more completely understood by reading the following detailed description of the preferred embodiments with reference to the accompanying drawings wherein.

DESCRIPTION OF THE PREFERRED EMBODIMENT

Figure 1:
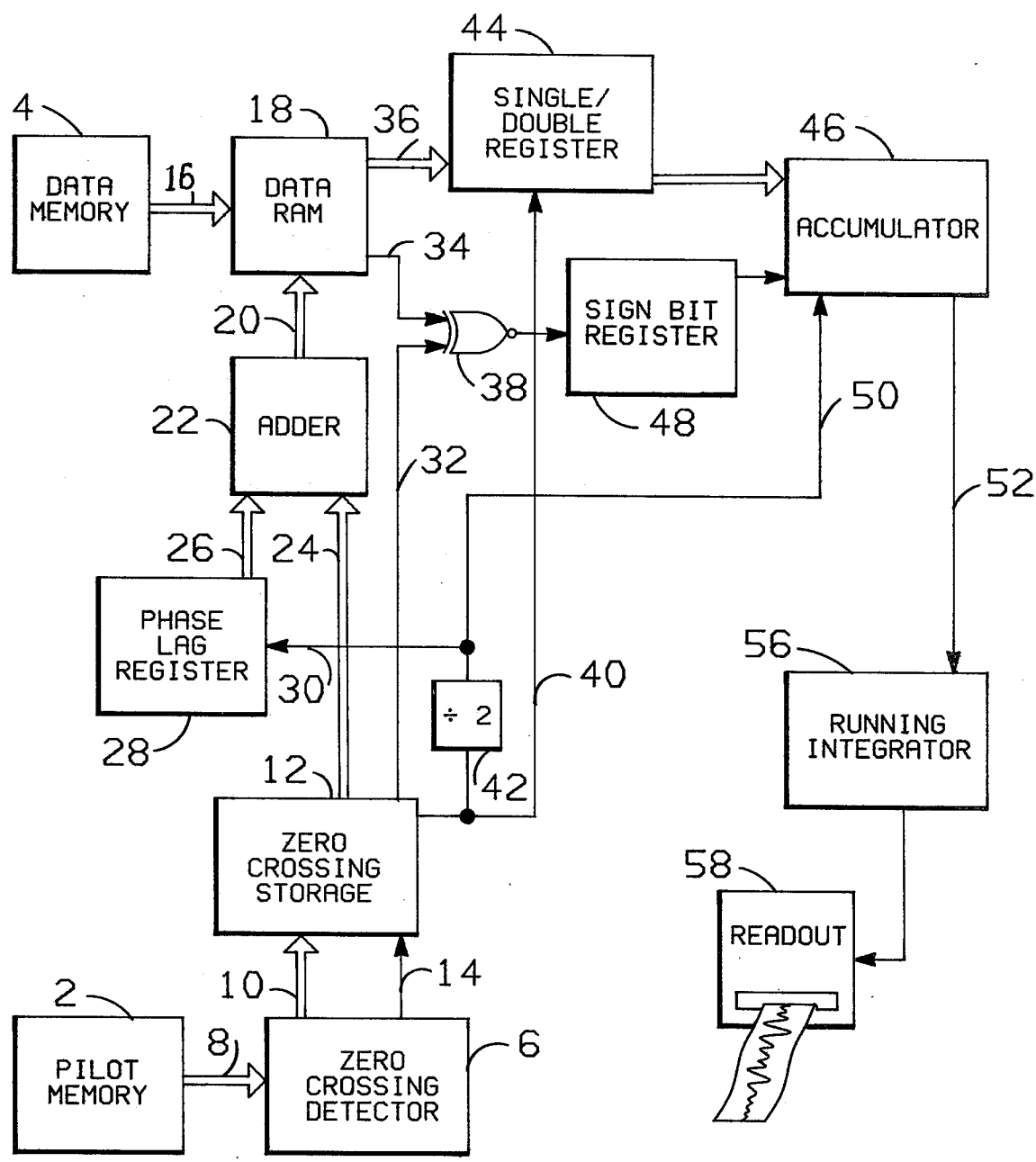
FIG. 1 is a combination block and logic diagram of a first embodiment of a digital correlator according to the present invention; and, FIG. 2 is a combination block and logic diagram of a second embodiment of a digital correlator according to the present invention.

A brief mathematical explanation of the present invention will simplify understanding of the preferred embodiment. The explanations of known digital correlation methods which are contained in the above referenced Siems and Savit patents are hereby incorporated by reference. A short expression of the sampled cross correlation value, $\phi_L$, for a given lag L is:

$$\phi_L = \sum_{j=1}^{k} D_{j+L} P_j \tag{1}$$

where: the pilot signal consists of k samples; $P_j$ is the jth sample of the pilot signal; and, $D_{j+L}$ is the (j+L)th sample of a data signal. If the pilot signal is converted to a sign bit only series and correlated with the same data series, the cross correlation function may be described as:

$$\phi_L = \sum_{j=1}^{k} (\pm) D_{j+L} \begin{cases} (+) \text{ if } P_j > 0 \\ (-) \text{ if } P_j > 0 \end{cases} \tag{2}$$

In other words, the correlation is simply the sum of all data samples which correspond to pilot samples but with the sign of data samples modified according to the sign of the corresponding pilot sample. What has now been recognized in the present invention is that the difference between successive cross correlations according to Equation (2) may be expressed as:

$$\phi_{L+1} - \phi_L = \sum_{i=1}^{n} (\pm) 2D_{z_i + L} \begin{cases} + \text{ if } i \text{ is even} \\ - \text{ if } i \text{ is odd} \end{cases} \quad (3)$$

where: the first zero crossing is positive going; there are $n$ zero crossings in the pilot signal; $z_i$ is the sample number of the $i$th zero crossing of the pilot signal; and, $D_{z_i+L}$ is the data sample occurring at a lag L later than the $i$th zero crossing of the pilot. In other words, the difference between successive correlations is equal to a summation of data samples occurring at zero crossings of the pilot signal. The factor of two in equation (3) results from the fact that each $D_{z_i+L}$ sample which was added to the sum forming $\phi_L$ is now subtracted from the sum forming $\phi_{L+1}$ so that the difference includes 2 $D_{z_i+L}$. A more detailed study of equations (2) and (3) also shows that the first and last data samples used in equation (3) should not be multiplied by two and this is incorporated in the preferred embodiments described below. These simpler equations, (2) and (3), are included here as a concise illustration of the concept of the present invention.

The quantity $(\phi_{L+1} - \phi_L)$ defined by equation (3) is clearly the difference of two successive correlations and not an actual absolute value on a cross correlation curve. To arrive at the true correlation curve the output of apparatus performing the operation defined by equation (3) must be integrated or, in a digital system, sequentially accumulated. This additional operation is simple to accomplish and may be performed by an output device such as a strip chart recorder which records the integral of its input.

A general comparison of implementation of correlators performing the operations defined by equations (2) and (3) will also aid understanding the present invention. A correlator performing the operation of equation (2) would include adders or accumulators to sequentially sum each data sample corresponding to a pilot sample. This avoids the multiplication operation of earlier correlators, but does require an operation on a number of data samples equal to the number of pilot signal samples for each correlation. In a typical seismic system using a 7-second long pilot signal with a frequency sweep of 14 to 56 hertz and a four-millisecond sample interval, the number of pilot samples is 1750. In contrast, implementations of equation (3), such as the preferred embodiments, only operate on a number of data samples corresponding to the number of zero crossings of the pilot signal. The pilot signal described above has only 491 zero crossings.

With reference to FIG. 1, there is illustrated a correlator according to the present invention. Included in the correlator is a pilot memory 2 which may be, for example, a magnetic tape or disk memory. Where the correlator is included as only a portion of a truck-mounted geophysical prospecting system, pilot memory 2 may be a part of the vibrator controller or part of a digital tape recording system which stores the pilot signal for later processing by a general purpose computer. A data memory 4 is likewise a magnetic tape or disk memory, which stores digital samples of the output of a geophone spread which detects seismic signals reflected from subsurface interfaces. In a typical system memory 4 is simply the magnetic tape memory which stores the geophone outputs for later detailed processing.

In this embodiment a zero crossing detector 6 is connected to pilot memory 2 by multiconductor line 8. The data in memory 2 is a series of digital quantities which represent samples taken on a 4 millisecond time spacing of a swept frequency sine wave which is used to drive an acoustic vibrator for coupling the signal into the earth. The same sampled digital signal is coupled along line 8 to zero crossing detector 6 which performs two functions. Detector 6 counts the total number of samples which it receives from memory 2 and transfers this count along a multiconductor cable 10 to a zero crossing storage unit 12 each time it receives a sample from memory 2 which has a sign opposite from the previous sample received from memory 2. Detector 6 also provides, on a single conductor line 14, an indication of whether the zero crossing was positive to negative or negative to positive. Zero crossing storage unit 12 is, in the preferred embodiment, a random access memory. The numbers received on line 10 from detector 6 which indicate positions of zero crossings in the pilot signal are stored at sequential addresses of the storage unit 12. The bit received on line 14 indicating direction of zero crossing is stored along with corresponding information on line 10. Thus, if the tenth zero crossing of the pilot signal stored in memory 2 occurred when the sixty-fifth sample was received by detector 6, and it was a negative-going zero crossing, then at the tenth address in storage unit 12 a digital representation of the number 65 would be stored along with a digital one indicating that the zero crossing was negative-going. The zero crossing information stored in memory 12 may be considered to be zero crossing addresses or zero crossing time locations. For the above example in which the tenth zero crossing occurs at the sixty-fifth sample, the tenth zero crossing may be considered to occur at address 65 of the series of digital quantities representing the pilot signal. Since samples occur on a regular 4-millisecond sample rate, in the preferred embodiment, the sixty-fifth sample also occurs at a time location of 0.26 second (65 × 0.004 second) after the beginning of the pilot signal.

The data in memory 4 is coupled along a multiconductor cable 16 to a data random access memory 18. The data words are read serially from memory 4 and stored sequentially in the addresses of random access memory 18; that is, for example, the twentieth data sample read from memory 4 is stored at memory address twenty of random access memory 18. An address input of memory 18 is coupled by a multiconductor cable 20 to an adder 22. Adder 22 has two inputs, one of which is coupled by a multiconductor cable 24 to an output of zero crossing storage unit 12. The other input of adder 22 is coupled by a multiconductor cable 26 to an output of a phase lag register 28. In the preferred embodiment register 28 is simply a ripple-through counter which increases its stored value by one bit each time a pulse is received on an input line 30. The zero crossing storage unit 12 provides, on its output line 24, the numbers representing the sample locations of the zero crossings of the pilot signal. Storage unit 12 simultaneously provides, on line 32, a single digital bit representative of the direction of the zero crossing which occurred at the sample location indicated on line 24. Random access memory 18 likewise has a sign bit output line 34 on which it provides the sign of the value of a data sample which it provides on an output line 36. An exclusive NOR gate 38 has two inputs coupled to lines 32 and 34 from storage unit 12 and random access memory 18, respectively. The function of gate 38 is to modify the signs of data samples read from data memory 18 where those data samples correspond to positive-going zero crossings of the pilot signal while not changing the sign of data samples in memory 18 which correspond to negative-going zero crossings of the pilot signal stored in memory 2.

Zero crossing storage unit 12 has a third output 40 for providing indications that the first and last samples stored in unit 12 are being read out on lines 24 and 32. This output 40 of unit 12 is coupled directly to a divide-by-2 cell 42 and a single/double register 44. The output of divide-by-2 unit 42 is coupled to input 30 of phase lag register 28 and to a reset input of an accumulator 46. Register 44 is a parallel-in parallel-out shift register having the ability to shift the mantissa portion of the data within the register by one bit between the input and output cycle. This shifting effectively doubles the value of the number stored in register 44 between the time the number is read in and the number is read out. Register 44 automatically doubles each number read into it unless it receives a signal on line 40. Thus, all the samples except those corresponding to the first and last numbers stored in unit 12 are doubled before being provided at the output of register 44.

A sign bit register 48 has an input coupled to the output of gate 38 and provides temporary storage of the sign of a data value when the mantissa and exponent are temporarily stored in register 44. The outputs of registers 44 and 48 are coupled to summing inputs of accumulator 46 and as each value is coupled to accumulator 46 is is added to a previously accumulated total. When accumulator 46 receives an input pulse on its reset input 50, which is coupled to the output of divided-by-2 unit 42, the accumulator couples its stored sum to an output line 52 and then resets itself to zero.

Output 52 of accumulator 46 is connected to an integrator 56 for generating an earth spikes trace. An output of integrator 56 is coupled to a strip chart recorder readout unit 58 which generates an inked trace representative of the output of accumulator 52. Strip chart recorders having an integrating input are also available and may be used in place of both integrator 56 and recorder 58.

In operation, the correlator has essentially two distinct cycles, the first being for loading data and the second for the actual correlation. During the data loading cycle the pilot signal is sequentially coupled from memory 2 along line 8 to zero crossing detector 6. As detector 6 encounters each zero crossing of the signal coupled to it, it stores the data sample number and an indication of the zero crossing direction at sequential addresses in zero crossing storage unit 12. The resulting information stored in unit 12 is the equivalent of a complete sign bit series representation of the pilot signal. This storage of only the address of each zero crossing and its direction requires fewer storage addresses than would storage of a sign bit for each pilot sample. This storage method also interfaces very well with the rest of the present correlator and for these reasons is preferred. Storage unit 12 also automatically stores an indicator showing which two stored values are the first and last. While this pilot information is being loaded into storage unit 12, data samples stored in data memory 4 are also sequentially coupled along line 16 to data random access memory 18 and stored there at sequential addresses. When all the data samples in memory 4 have been coupled to random access memory 18, the data loading cycle ends and the correlation cycle begins.

The first step of the correlation cycle involves resetting registers 28, 44, and 48, divide-by-2 unit 42, and accumulator 46 all to zero in the event they did not start up at this zero state. Then, zero crossing storage unit 12 begins sequentially reading out its stored information in the order of its addresses. The information at address 1 is coupled along lines 24 through adder 22 and lines 20 to the address input of random access memory 18. This causes memory 18 to provide on its output lines 36 and 34 the information which it has stored at the address corresponding to the first zero crossing in the pilot signal. The amplitude of the sample data which is present on line 36 is loaded into register 44 and provided at the output of register 44 unchanged, because output 40 of storage unit 12 is high indicating that this is the first sample called by storage unit 12. The sign of the first sample read from memory 18 is coupled along line 34 to gate 38 which either changes the sign or leaves it unchanged depending upon the second input of gate 38, which is an indication of the direction of the zero crossing which occurs at this address in the pilot signals. The output of gate 38 (that is, the modified sign bit) is loaded into register 48 and provided at its output. The outputs of registers 44 and 48 are then stored in accumulator 46 by being added to the previously stored total, which in this case was zero. Storage unit 12 then provides at its output the address of the second zero crossing of the pilot signal on line 24 and the indication of the direction of that zero crossing on line 32. As with the first sample, this new address causes memory 18 to provide at its output the data sample corresponding to this second zero crossing, which is then coupled to registers 44 and through gate 38 to register 48. For the second sample, output 40 of storage unit 12 is low and register 44 provides at its output a digital number having a value of double that which it received at its input. Accumulator 46 then adds this new value to the previously accumulated total which was the value of the first sample. The address input of zero crossing storage unit 12 is continuously incremented by one bit so that all the data values stored in memory 18 which correspond to zero crossings of the pilot stored in memory 2 are algebraically summed in accumulator 46. When the last sample is summed the output 40 of unit 12 goes high again, so that single/double register 44 passes the last accumulated sample to accumulator 46 without multiplication by 2. When line 40 goes high for this second time, divide-by-2 unit 42 generates an output which is coupled to phase lag register 28 and to accumulator 46. In response to this signal, accumulator 46 provides its final total on output line 52 which is coupled to integrator 56. Integrator 56 uses the value to begin an integration cycle and provides an integrated output to readout 58, where a stylus is controlled to provide a visual output.

The phase lag register 28 also responds to the output of the divide-by-2 unit 42 by incrementing its value by one. During the first correlation cycle, register 28 had a stored value of zero so that the addresses on output line 24 of storage unit 12 appeared unchanged on output 20 of adder 22. During the second correlation cycle, the 1 stored in register 28 is added to each address coupled along line 24 to adder 22 so that memory 18 is addressed one address later for each zero crossing. Other than this shift of phase between the pilot signal and the data signal, a second correlation cycle proceeds exactly like the first. At the end of the cycle, a second sum is coupled to output 52 of accumulator 46 so that a second point is plotted on readout 58. The strip chart on unit 58 actually moves continuously at a fixed speed and the repetitive correlation outputs of accumulator 46 occur at fixed time spacings so that the output trace of readout 58 is continuous on a linear time scale. When the last address stored in zero crossing storage unit 12 plus the phase lag stored in register 28 exceed the last address in memory 18 at which actual data is stored, the correlation of the pilot signal and the data is complete and the summation cycle is terminated. At this point, a complete earth spikes trace is permanently recorded on the paper tape output of readout 58 and the correlator is ready to receive new data from memory 4 and possibly new pilot signals from memory 2.

Figure 2:
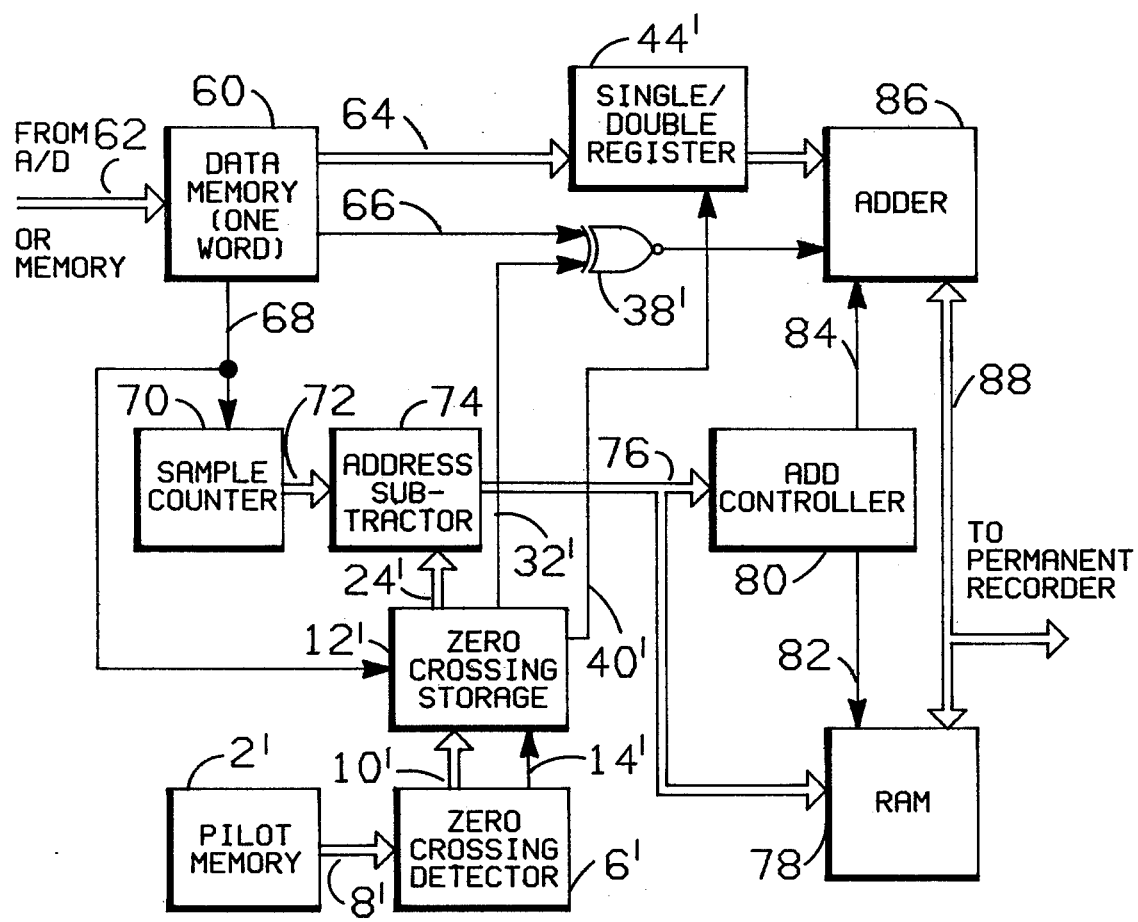

With reference now to FIG. 2, there is illustrated a second embodiment of the present invention which performs the summations required by equation 3, but in an order different from that performed by the FIG. 1 embodiment. Elements of FIG. 2, which are essentially the same as those of FIG. 1 and which perform the same functions, are designated by the same numbers used in FIG. 1 with a prime added; therefore, a description of pilot memory 2', zero crossing detector 6', zero crossing storage unit 12', NOR gate 38', single-double register 44', and associated input and output lines will not be included here. The FIG. 2 embodiment also includes a data memory 60, having a capacity to store only one data word at a time. Memory 60 has a multiconductor input line 62 on which it receives one data word at a time either from a memory, such as data memory 4 of FIG. 1, or from an analog-to-digital converter which is part of a data recording system. Memory 60 has an output line 64 on which it provides the mantissa and exponent of the words which it stores. Memory 60 provides the sign of the word which it stores on another output line 66. In addition, memory 60 provides an output pulse on a line 68 whenever it receives a new data word on line 62. Line 68 is connected to an input of a sample counter 70 and to an input of zero crossing storage unit 12'. Sample counter 70 is a simple ripple-through counter which increases its stored value by one digital bit each time it receives a signal on its input line. The number stored in counter 70 is continuously provided on an output line 72 which is coupled to one input of an address subtractor 74. A second input of subtractor 74 is the output line 24' from zero crossing storage unit 12'. Subtractor 74 provides an output on a line 76 which is equal to the number on line 72 minus the number on line 24'. Line 76 is coupled to an address input of a random access memory 78 and to an input of an ADD controller 80. Controller 80 provides outputs on a line 82, which is connected to a read-write control input of random access memory 78. Control line 82 may actually be more than one line depending upon the control signals which are required by the memory device selected for memory 78. Controller 80 also provides an output on line 34, which is coupled to a control input of an adder 86. Line 84 may also be more than one signal line. Adder 86 also has inputs coupled to the outputs of gate 38' and single-double register 44'. A multiconductor line 88 is connected to adder 86 and to random access memory 78 for coupling signals in both directions between these two units. The line 88 also couples signals to a permanent recorder such as the read-out unit 58 of FIG. 1.

A brief description of the organization of information stored in random access memory 78 will aid in understanding the overall operation of the FIG. 2 embodiment. In a typical geophysical prospecting system which uses a 4-ms sample interval, there is a total of approximately 3,000 data words recorded for each initiation and the complete digitized pilot signal comprises about 2,000 words. For such a case, the earth spikes trace actually comprises about 1,000 points generated by correlating the pilot signal with data samples at 1,000 different lag values, with lag separations equaling the sampling period of 4 mm. Random access memory 78 has one storage location or address for each of these 1,000 lag values. At the end of a complete correlation cycle the value of the correlation for a pilot lag of zero is stored at address zero, for a lag of one it is stored at address 1, for a lag of two it is stored at address 2, etc. The need for this temporary storage of the correlation values is more clearly explained by the following description of the operation of this FIG. 2 embodiment.

In operation, the embodiment of FIG. 2 has two sequences like the FIG. 1 embodiment, but the first sequence only involves loading the pilot samples from memory 2' through zero crossing detector 6' to zero crossing storage unit 12' in exactly the same manner as described for the FIG. 1 embodiment. Sample counter 70 is then reset to a value of minus 1 and random access memory 78 is reset to have a zero value stored at all of its addresses. The system is then ready to begin correlating as soon as the first data word is received on line 62 by memory 60. When memory 60 has received this word and stored it, it generates a pulse on line 68. This pulse is coupled to sample counter 70, which increments by one bit to a zero value. The pulse on line 68 is also coupled to zero crossing storage unit 12' and causes it to start reading out on line 24' the zero crossing addresses which it has stored. When the address of the first zero crossing appears on line 24', subtractor 74 subtracts this value from the number on line 72, which in this case is zero, and provides the difference on line 76. Line 76 couples this number both to the address input of random access memory 78 and to controller 80. If the number received by controller 80 is positive or zero and smaller than a preselected maximum lag value which is 1000 for the above example, controller 80 provides a signal on line 82, causing random access memory 78 to provide on line 88 the contents of the address which it received on line 76. While this addressing process was occurring, the data word in memory 60 was coupled along lines 64 and 66 to register 44' and gate 38', respectively. Since the address read out on line 24' was the first one stored in storage unit 12', a signal is provided on line 40', causing register 44 to provide at its output the same number which it received on line 64. Gate 38' likewise receives an input on line 32' from unit 12', causing it to modify the sign which it receives on line 66 in the appropriate manner. Adder 86 thus has a modified data word coupled to it from the outputs of register 44' and gate 38' and also receives the contents of a memory address from memory 78 on line 88. If controller 80 has received an appropriate input on line 76, it provides a pulse on line 84 to cause adder 86 to add the two inputs which it has and couple the sum back onto line 88. When this sum has been coupled back onto line 88, controller 80 provides a signal on line 82 instructing random access memory 78 to write the new sum back into the memory location which is addressed. It should be noted that for this summation process to occur when sample counter 70 is at zero and the first address has been read out of unit 12', that address must have been zero. For any other address the number on line 76 would be negative and controller 80 would not instruct memory 78 and adder 86 to perform an add sequence. While the first data word is stored in memory 60, zero crossing storage unit 12' continues through its sequence of reading out all of the zero crossing addresses to subtractor 74. When unit 12 has reached the last zero crossing address, it stops its sequence of reading out and waits for a new signal on line 68 from memory 60. When the second data word appears on line 62 and is coupled into memory 60, a second pulse is generated on line 68 to cause sample counter 70 to increment to a value of 1 and to cause storage unit 12' to begin a new sequence of reading out zero crossing addresses. The sequence is likewise repeated for each data word in the entire series of data words. When the zero crossing address readout sequence has been completed for the last data word, a complete differential earth spikes trace, comprising in this embodiment 1,000 differential correlation points, is stored in memory 78. An actual earth spikes trace may then be generated from the differential information stored in memory 78 by sequentially reading out its contents to an integrator such as integrator 56 of FIG. 1 and coupling the integrated output to a strip chart recorder such as readout 58 of FIG. 1. Either the memory 78 or the integrator 56 outputs may, of course, be coupled to other types of recorders such as magnetic tape or disk memories for later use as may be desired.

In many present swept frequency geophysical prospecting systems it is common practice to add, or sum, th data recorded from a series of initiations to generate a composite data record. The purpose of this summing practice is to improve the signal-to-noise ratio of the data. This FIG. 2 embodiment may be used to provide the sum of a series of differential correlations by simply not resetting to zero the stored information in memory 78 before the second, and subsequent correlations are performed. Then when the second correlation begins the previous differential correlation information is already stored in memory 78 and the new information is added to it. This process may be repeated for any desired number of initiations before resetting memory 78 to zero.

While this FIG. 2 embodiment is a less straightforward way of generating the correlations described by equation 3 than is the FIG. 1 embodiment, it has several advantages. The data random access memory 18 of FIG. 1 must have enough storage capacity to store the entire data series. As stated above, this amounts to approximately 3,000 digital words. In contrast, the memory 78 of FIG. 2 need only have enough storage capacity to store all of the correlation values which totals only about 1,000 for the same system in which the data system contains 3,000 words. In the FIG. 1 embodiment the entire data series must be recorded and stored in memory 18 before the time when the first correlation begins. In the FIG. 2 embodiment, only the zero crossing addresses need to be stored before correlation begins. The pilot signal is typically prerecorded on magnetic tape or stored in a solid-state read-only memory before seismic initiations are made and is thus available for generating the zero crossing information before any actual data is taken. Therefore, it is possible by proper selection of high-speed logic elements to provide an essentially real-time correlation with the FIG. 2 embodiment.

Various modifications of the present invention will be apparent to those skilled in the art. For example, since the apparatus of the preferred embodiments generates an output equal to the derivative of the correlation function, it may be desirable to perform a single complete correlation cycle according to equation (2) at the beginning of each trace. Such a step would more accurately identify the proper starting point or DC level of an earth spikes trace. Since seismometers typically cannot detect a DC level, the preferred embodiments do not include means for generating this initial complete correlation. The single/double register 44 could also be modified when used in a gain ranging system having gain increments of two. In such systems a multiplication by two can be easily accomplished by adding "1" to the exponent portion of a data sample. This would be simpler than shifting the entire mantissa as is done in the preferred embodiment, but would be limited to cases where gain ranging is by factors of 2. Since gain ranging by factors of 4 is common, the preferred embodiments incorporate the mantissa shifting method. It is also apparent that memories 12 and 18 of FIG. 1 and memories 12' and 78 of FIG. 2 do not necessarily need to be of the random access type. A memory which can only read out serially, such as a magnetic bubble memory, could provide faster operating speeds for these purposes and would be quite suitable for use as memories 12 and 12' which simply read out all stored information in the order in which it is stored. For the same reason such memories would be useful as memories 18 and 78 since these memories are always addressed in increasing address order. Although the present invention has been shown and illustrated in terms of specific apparatus, it is apparent that these and other changes or modifications can be made without departing from the spirit and the scope of the invention as defined by the appended claims.

I claim:

1. Electronic apparatus for correlating two time series of sampled quantities comprising:

sign bit series means having an input for receiving a first of said two time series of sampled quantities and having an output for providing a sign bit representation of said first series, said representation including addresses of zero crossings of said first series and indications of direction of each zero crossing;

data input means having first input for receiving a second of said two time series of sampled quantities, a second input coupled to the sign bit series means output for receiving zero crossing addresses, and an output for providing sampled quantities of said second series which correspond to zero crossings of said first series;

sign modifying means having a first input coupled to said data input means for receiving the sign portion of sampled quantities of said second series, a second input coupled to the sign bit series means for receiving zero crossing direction indications, and an output for providing a modified sign portion; and summing means coupled to said data input means' output and to said sign modifying means' output for algebraically summing sampled quantities of said second series which correspond to zero crossings of said first time series.

2. Electronic apparatus according to claim 1 wherein said data input means is a random access memory having one storage location for each quantity of the second series of sampled quantities.

3. Electronic apparatus according to claim 1 wherein said data input means and said summing means include:
   data storage means having an input for receiving and storing one sample of the second time series at a time, a first output for providing the stored sampled quantity, and a second output for providing an indication of receipt of a sample;
   a sample counter having an input coupled to the second output of the data storage means and an output for providing an indication of the total number of samples receiving by the data storage means;
   an address subtractor having inputs coupled to the output of the sample counter and to the output of the sign bit series means and an output for providing the difference between the sample counter output and the sign bit series means' zero crossing address output;
   a memory having an address input coupled to the address subtractor output and having an output for reading and writing information from and into an addressed memory location; and
   an adder having a first input coupled to the data storage means output, a second input coupled to the sign modifying means output, and a third input coupled to the memory output for algebraically adding the sample quantity received on its first and second inputs to a quantity received from the memory and for coupling the sum back to the memory.

4. Electronic apparatus according to claim 1 further including multiplier means coupled to said data input means and to said summing means for doubling the magnitude of each value of said second series which is coupled to the output of the data input means, except for the first and last values.

5. Electronic apparatus according to claim 1 further including integrator means coupled to said summing means for generating an integral of a sequence of outputs of said summing means.

6. Electronic apparatus according to claim 5 wherein said integrator means is a strip chart recorder which generates a visual record corresponding to the integral of an input signal.

7. A method for determining the degree of correlation of two time series of sampled electrical values comprising:
   introducing a first of said two series to an electronic zero crossing detector for detecting the sample numbers and directions of zero crossings of said first series and for providing outputs indicating said sample numbers and directions;
   introducing the second of said series to an electronic sample selector for, in response to the outputs of said zero crossing detector, selecting sampled values of said second series which correspond to zero crossings of said first series;
   introducing the selected sampled values of said second series into an electronic sign-modifying means for, in response to the outputs of said zero crossing detector, changing the sign of the selected values of said second series which correspond to positive going zero crossings of said first series; and
   outputting said selected and sign-modified values of said second series to an electronic summer for algebraically summing said selected and sign-modified values of said second series and for providing an output indicating the sum whereby said sum indicates the degree of correlation between said two time series of sampled electrical values.

8. A method according to claim 7 further including the steps of:
   outputting the sample numbers and directions of zero crossigns of said first series from said zero crossing detector to a phase shifter for adding one unit to each address of zero crossings of said first series;
   introducing said second series to the sample selector for, in response to the outputs of said phase shifter, selecting sampled values of said second series which correspond to phase-shifted zero crossings of said first series;
   introducing the selected values of said second series into the sign-modifying means for, in response to the outputs of said phase shifter, changing the sign of the selected values of the second series which correspond to phase-shifted, positive-going zero crossings of said first series; and
   outputting said selected and sign-modified values of said second series to the summer for algebraically summing said selected and sign-modified values of said second series.

9. A method according to claim 8 further including the step of sequentially introducing the outputs of the summer into an integrator for generating the integral of said outputs.

* * * * *

UNITED STATES PATENT OFFICE
CERTIFICATE OF CORRECTION

PATENT NO. : 4,121,297
DATED : October 17, 1978
INVENTOR(S) : James W. Smith

It is certified that error appears in the above-identified patent and that said Letters Patent are hereby corrected as shown below:

Column 2, lines 63-65, " $\phi_L = \sum_{j=1}^{k} (\pm) D_{j+L} \begin{cases} (+) \text{ if } P_j > 0 \\ (-) \text{ if } P_j > 0 \end{cases}$ " should read -- $\phi'_L = \sum_{j=1}^{k} (\pm) D_{j+L} \begin{cases} (+) \text{ if } P_j > 0 \\ (-) \text{ if } P_j < 0 \end{cases}$ -- .

Column 5, line 35, "is" (first occurrence) should read --it--.

Column 6, line 16, "sample data" should read --data sample--.
line 23, "signals" should read --signal--.

Column 7, line 60, "34" should read --84--.

Column 9, line 33, "th" should read --the--.

Signed and Sealed this

First Day of May 1979

[SEAL]

Attest:

RUTH C. MASON
Attesting Officer

DONALD W. BANNER
Commissioner of Patents and Trademarks